United States Patent
Bastioli et al.

(10) Patent No.: US 10,017,597 B2
(45) Date of Patent: Jul. 10, 2018

(54) BIODEGRADABLE POLYESTER

(75) Inventors: Catia Bastioli, Novara (IT); Luigi Capuzzi, Novara (IT)

(73) Assignee: NOVAMONT S.P.A., Novara (IT)

( * ) Notice: Subject to any disclaimer, the term of this patent is extended or adjusted under 35 U.S.C. 154(b) by 0 days.

(21) Appl. No.: 13/497,864

(22) PCT Filed: Sep. 24, 2010

(86) PCT No.: PCT/EP2010/064185
§ 371 (c)(1),
(2), (4) Date: Mar. 23, 2012

(87) PCT Pub. No.: WO2011/036272
PCT Pub. Date: Mar. 31, 2011

(65) Prior Publication Data
US 2012/0178896 A1    Jul. 12, 2012

(30) Foreign Application Priority Data
Sep. 25, 2009 (IT) .............................. MI2009A1641

(51) Int. Cl.
| | | |
|---|---|---|
| *C08F 290/00* | (2006.01) | |
| *C08G 63/91* | (2006.01) | |
| *C08G 63/21* | (2006.01) | |
| *C08K 5/09* | (2006.01) | |
| *C08K 5/14* | (2006.01) | |

(52) U.S. Cl.
CPC ............ *C08F 290/00* (2013.01); *C08G 63/21* (2013.01); *C08G 63/918* (2013.01); *C08K 5/09* (2013.01); *C08K 5/14* (2013.01)

(58) Field of Classification Search
CPC ....... C08L 67/06; C08G 63/52; C08G 63/553; C08G 63/91; C08G 63/47; C08G 63/46; C08G 63/914; C08G 63/16; C08G 63/21; C08G 63/918; C08F 283/46; C08F 290/00; C08K 5/09; C08K 5/14
USPC .............................................. 528/303; 525/11
See application file for complete search history.

(56) References Cited

U.S. PATENT DOCUMENTS

2005/0054813 A1* 3/2005 Bastioli et al. ............... 528/272
2008/0214724 A1   9/2008 Bastioli et al.

FOREIGN PATENT DOCUMENTS

| EP | 1721935 A1 | 11/2006 |
|---|---|---|
| JP | H04-072316 | 3/1992 |
| JP | H-0790043 A | 4/1995 |
| JP | 2003221423 A | 8/2003 |
| WO | WO-03/089490 A2 | 10/2003 |
| WO | WO-2006/053936 A1 | 10/2003 |
| WO | WO-2006/097353 A1 | 9/2006 |
| WO | WO-2007-120148 A1 | 10/2007 |

* cited by examiner

*Primary Examiner* — Ling Choi
*Assistant Examiner* — Gennadiy Mesh
(74) *Attorney, Agent, or Firm* — Polsinelli PC

(57) ABSTRACT

A substantially gel-free and substantially linear biodegradable polyester obtainable by reaction with a radical initiator starting from a precursor polyester provided with an unsaturated chain terminator, wherein the terminator has the formula: T-(CH2)n-CH=CH2, wherein "T" is selected from hydroxylic, carboxylic, amine, amide or ester group, and "n" is an integer comprised between 0 and 13. The content of the unsaturated chain terminator is between 0.01 and less than 1% by moles with respect to the moles of repetitive units of the polyester precursor; and the content of the radical initiator is less than 0.08 wt % with respect to the quantity of the precursor polyester.

15 Claims, 2 Drawing Sheets

BIODEGRADABLE POLYESTER

CROSS REFERENCE TO RELATED APPLICATIONS

Figure 1A:
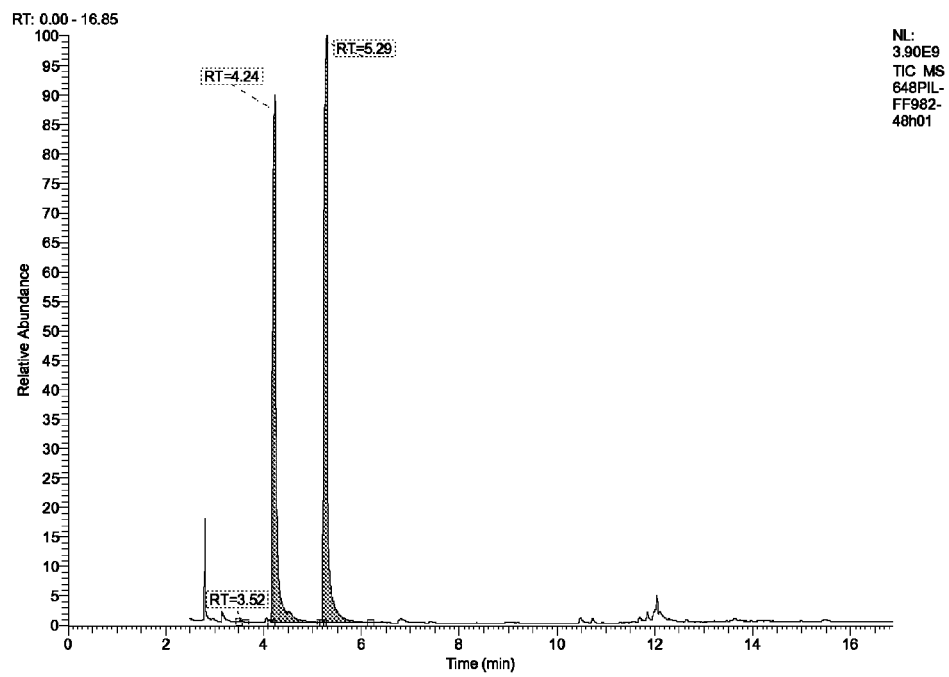

This application is a National Phase filing under 35 U.S.C. § 371 of PCT/EP2010/064185 filed on Sep. 24, 2010; and this application claims priority to Application No. MI2009A001641 filed in Italy on Sep. 25, 2009 under 35 U.S.C. § 119; the entire contents of all are hereby incorporated by reference.

DESCRIPTION

The present invention relates to a substantially gel-free and substantially linear biodegradable thermoplastic polyester (BP) comprising units deriving from at least one diacid and at least one diol, obtainable by means of reaction with radical initiators starting from a precursor polyester (PP) provided with an unsaturated chain terminator, said terminator having the formula:

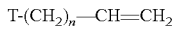

T-$(CH_2)_n$—CH=$CH_2$ wherein "T" is selected from the group consisting of hydroxylic, carboxylic, amine, amide or ester group and "n" is an integer comprised between 0 and 13.

The present invention also relates to a process for obtaining said biodegradable polyester BP.

The use of biodegradable polyesters currently available on the market is limited due to various types of drawbacks. For example, there are difficulties related to their rheological properties, which limit their use in the various transformation technologies commonly adopted for conventional plastic materials unless chain extenders of different type are used. However, these chain extenders, such as isocyanates, epoxy acrylates, etc., usually have a much greater impact on the environment than the polyester itself. Another issue linked to the use of such chain extenders is the smell of the final polyesters which is due to the presence of their chemical residues. The latter is particularly critical when using these chain extenders in the production of packaging articles particularly for food packaging applications.

On the other hand, without the use of these additives there are considerable limits related to the final properties of the goods produced with these polymers, such as unsatisfactory mechanical properties.

Within the production processes of biodegradable polyesters, it is known to make use of chain extension reactions also with radical initiators during which the properties of said polyesters are improved through the increase in molecular weight.

However, the high reactivity of these initiators (such as organic peroxides) often make the chain extension reactions difficult to manage, giving rise to the formation of excessively branched structures. Such branched structures limit the applicability of polyesters in the various transformation technologies, and at the same time negatively influence the mechanical properties thereof in terms of toughness.

To overcome these problems, the use of unsaturated chain terminators is known, which by modifying the reactivity of the polyesters promote the action of the radical initiators.

For example, JP-2746525 describes a chain extension process with peroxides of hydroxyl terminated aliphatic polyesters, with high molecular weight, extended by a mixture of saturated and unsaturated isocyanates, where the unsaturated isocyanates bear an acrylate group. The acrylic terminal group is inserted in the chain to control the reactivity of the polyesters to the peroxides.

To reach appropriate rheological and mechanical properties said polyesters require the use of high amounts of radical initiator. In fact, to guarantee the polyester satisfactory properties the prepolymer bearing the unsaturated acrylic terminal group is then made to react in a subsequent step with a quantity of peroxides comprised between 0.1 and 5% by weight. Moreover, said acrylic terminal group must be inserted on a prepolymer having weight average molecular weight (Mw) of over 30,000.

The process described by JP-2746525 therefore involves a process in three steps and the use of high quantities of organic peroxides, giving rise to polyesters characterized by a number average molecular weight (Mn) around 30,000 and very large molecular weight distribution (MWD).

WO 2006/053936 discloses a crosslinked thermosetting aliphatic polyester obtained by reacting free radicals with a precursor polyester comprising an hydroxyacid or a diacid and diol, a functionalising agent (which can be a diol or polyfunctional alcohol, or a dicarboxylic acid or polyfunctional carboxylic acid) and possibly other monomers such as ε-caprolactone or unsaturated components like itaconic acid. In order to increase the speed of crosslinking said precursor polyester is end-functionalized with compounds containing double bonds such as methacrylic anhydride.

One further drawback of several biodegradable polyesters currently available on the market is represented by their poor compatibility with starch, which limits their use in the field of biodegradable plastics, for example for producing films.

The limits of the type mentioned above are now overcome by the present invention.

In fact, the present invention relates to a substantially gel-free and substantially linear biodegradable thermoplastic polyester BP comprising units deriving from at least one diacid and at least one diol, obtainable by reaction with radical initiators starting from a precursor polyester PP provided with an unsaturated chain terminator, said terminator having the formula:

T-$(CH_2)_n$—CH=$CH_2$ wherein "T" is selected from the group consisting of hydroxylic, carboxylic, amine, amide or ester group, and "n" is an integer comprised between 0 and 13.

It has been furthermore surprisingly discovered that said biodegradable polyester BP shows improved processability, stable phase morphology as well as particularly enhanced compatibility with natural polymers and particularly with starch.

Thanks to its enhanced compatibility with natural polymers, the biodegradable polyester BP according to the present invention allows the production of starch based compositions showing improved mechanical properties as well as a tear strength superior to that of starch based composition with similar biodegradable polyesters.

The present invention also relates to a process for obtaining said biodegradable polyester BP The present invention also relates to the use of chain terminator having formula:

T-$(CH_2)_n$—CH=$CH_2$ wherein "T" is selected from the group consisting of hydroxylic, carboxylic, amine, amide or ester group, and "n" is an integer comprised between 0 and 13 for the chain extension of polyesters.

With the expression "thermoplastic" are meant herein all the polyesters capable of being repeatedly softened and hardened by heating and cooling through a temperature range characteristic for each polyester. In the aforesaid softened state thermoplastic polyesters can be shaped by flow into articles, for example by molding or extrusion.

Thermoplastic polyesters are therefore different from the curable ones which, by contrast, are polyesters irreversibly hardened by crosslinking of polymer chains. In this state, curable polyesters show a networked structure.

With the expression "substantially gel-free" are meant herein all the polyesters showing a gel fraction lower than 5% (w/w) with respect to the polyester, preferably lower than 3%. The gel fraction according to the present invention is measured by placing a sample of polyester ($X^1$) in chloroform under reflux for 8 hours, filtering the mixture on a sieve filtering grid of 25-45 μm and weighing the weight of the material that remains on the filtering grid ($X^2$). The gel fraction was determined as the ration of the material so obtained with respect to the weight of the sample ($X^2/X^1$)× 100.

With the expression "substantially linear" are meant herein all the polyesters showing a structure comprising the multiple repetition in linear sequence of repeating units (acids and diols held together by ester linkage) with at most 3% by moles with respect to the quantity of diacids or their derivatives (and hydroxy acids or their derivatives if present) of one or more polyfunctional molecules (i.e. molecules having more than 2 reactively active sites) such as glycerol.

Preferably the biodegradable polyester BP according to the present invention is characterized in melted state by a Shear Viscosity of 300 to 2,000 preferably between 400 and 1,800 Pas and more preferably 500-1500 Pas.

When used in applications to produce films the biodegradable polyester BP preferably has a Thermal Stability Constant of less than $2 \cdot 10^{-4}$ at 180° C., more preferably less than $1.5 \cdot 10^{-4}$ at 180° C. and melt strength at 180° C. between 0.9 and 3, more preferably between 1 and 2.9 g, still more preferably between 1.1-2.8 g.

With reference to the Shear Viscosity, it is determined at 180° C. and flow gradient $\gamma = 103.7$ s$^{-1}$ with a capillary having a diameter=1 mm and L/D=30 according to the standard ASTM D-3835-90 "Standard Test Method for Determination of Properties of Polymeric Materials by Means of a Capillary Rheometer".

The Thermal Stability Constant is measured according to the standard ASTM D-3835-Appendix, maintaining the polyester in melted state at a given temperature and measuring, at different times, the Shear Viscosity. The Thermal Stability Constant is expressed as $(\ln(\eta 1/\eta 2))/(t2-t1)$, i.e. the ratio between the natural logarithm of $(\eta 1/\eta 2)$ and the difference $(t2-t1)$, where t1 and t2 indicate two permanence times of the melt at the test temperature and $\eta 1$ and $\eta 2$ indicate the respective Shear Viscosities. The measurement is conducted at T=180° C., $\gamma = 103.7$ s$^{-1}$ with a capillary having diameter=1 mm and L/D=30.

The Melt Strength is measured according the international standard ISO 16790:2005, at 180° C. and $\gamma = 103.7$ s$^{-1}$. A capillary with diameter=1 mm and L/D=30, is used for the measurement, at constant acceleration of 12 mm/sec$^2$ and a stretch length of 110 mm. The molecular weight $M_n$ of the biodegradable polyester BP according to the present invention is preferably between 40,000 and 200,000 and more preferably between 50,000 and 180,000.

The molecular weight Mn can be measured by Gel Permeation Chromatography (GPC). Determination can be conducted with a chromatography system maintained at 40° C., using a set of three columns in series (particle diameter of 5μ and porosity respectively of 500 Å, 1000 Å and 10000 Å), a refraction index detector, chloroform as eluent (flow 1 ml/min) and using polystyrene as standard of reference.

The polyester BP according to the invention preferably shows a crystallinity greater than 10 as measured by X-ray diffractometry for example using a Philips X'Pert θ/2θ diffractometer with a Bragg-Brentano geometry, using X Cu Kα radiation with λ=1.5416 angstrom and operating power 1.6 kW. The angular range used is 5-60° (2θ) with steps of 0.03° (2θ) and acquisition time of 2 seconds per step. The % of crystallinity is calculated as the percentage between the crystalline phase area and the sum of the areas of crystalline and amorphous phases.

In the case of use of the plastic materials for typical applications (such as bubble films, injection molding products, foams, etc.) the Melt Flow Rate (MFR) of the biodegradable polyester BP according to the present invention is preferably between 200 and 1.0 g/10 min, more preferably between 100 and 1.5 g/10 min, even more preferably between 70 and 2 g/10 min (measurement effected at 190° C./2.16 kg according to the standard ASTM D1238-89 "Standard Test Method for Melt Flow Rates of Thermoplastics by Extrusion Plastometer"). When used in applications to produce biodegradable polyester PB films, it preferably has a Melt Flow Rate of less than 10 g/10 min.

Due to the specific characteristics of the unsaturated chain terminator, the precursor polyester PP is able to modulate the action of the radical initiators during the chain extension reactions leading to the formation of substantially linear high molecular weight polymer structures of the biodegradable polyester BP according to the invention. Its high reactivity also allows repeatable and reliable use in chain extension processes using radical initiators, greatly reducing the quantity of radical initiators to be used and at the same time limiting the use of chain extenders of different type as well as the occurrence of gels during said processes. In the present invention, unsaturated chain terminator is intended as compounds having the formula:

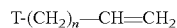

$$T-(CH_2)_n-CH=CH_2$$

wherein "T" is selected from the group consisting of hydroxylic, carboxylic, amine, amide or ester group, and "n" is an integer number comprised between 0 and 13.

Said unsaturated chain terminators can also be used in mixture.

With regard to "T", it is preferably a hydroxylic or carboxylic group.

The integer "n" is preferably comprised between 1 and 13, more preferably 3 and 13, still more preferably 8 or 9, omega-undecenoic acid, omega-undecylenic alcohol and mixtures thereof being particularly preferred in order to maximize compatibility with natural polymers. The content of the unsaturated chain terminator is less than or equal to 1%, preferably between 0.01-1 and more preferably between 0.01-0.5% by moles with respect to the moles of repetitive units of the polyester precursor. Preferably, less than 5% of polyester precursor chains have more than one unsaturated chain terminator.

The precursor polyester is advantageously selected from aliphatic and aliphatic-aromatic biodegradable polyesters. Far more preferably, the precursor polyester is an aliphatic-aromatic biodegradable polyester for the production of high thoughness materials.

With regard to the aliphatic precursor polyesters PP, these are composed by at least one aliphatic diacid, at least one aliphatic diol and the unsaturated chain terminator.

With regard to the aliphatic-aromatic precursor polyesters PP, these have the aromatic part principally composed by at least one aromatic polyfunctional acid and the aliphatic part composed by the unsaturated chain terminator, at least one aliphatic diacid and at least one aliphatic diol.

Advantageously, said aliphatic and aliphatic-aromatic polyesters PP can be composed by more than one type of repeating unit (acids and diols held together by ester linkage). In such a case, said polyesters preferably show a random structure with a randomness index of 0.95-1.05. With regard to the measurement of the randomness index, it can be performed via H-NMR.

With regard to the aliphatic diacids, those of type $C_2$-$C_{22}$ are taken into consideration.

Of the aliphatic diacids, $C_6$ (adipic acid), $C_7$ (pimelic acid), $C_8$ (suberic acid), $C_9$ (azelaic acid), $C_{10}$ (sebacic acid), $C_{11}$ (undecandioic acid), $C_{12}$ (dodecandioic acid) and $C_{13}$ (brassylic acid) are preferred. Among these, particularly preferred are aliphatic diacids from renewable sources and preferably $C_8$ (suberic acid), $C_9$ (azelaic acid), $C_{10}$ (sebacic acid), $C_{12}$ (dodecandioic acid) and $C_{13}$ (brassylic acid) and their esters. Even more preferred are aliphatic acids from renewable sources $C_9$ (azelaic acid), $C_{10}$ (sebacic acid) and their esters. Mixtures of these acids are also particularly interesting.

Polyfunctional aromatic acids are intended as dicarboxylic aromatic compounds of the phthalic acid type and their esters and dicarboxylic aromatic compounds of renewable origin and their esters. Particularly preferred are 2,5 furandicarboxylic acid and its esters and terephthalic acid and its esters, and mixtures thereof.

Examples of diols in accordance with the present invention are 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohexanedimethanol, propylene glycol, neo-pentyl glycol, 2-methyl-1,3-propanediol, dianhydrosorbitol, dianhydromannitol, dianhydroiditol, cyclohexanediol, cyclohexanemethandiol and mixtures thereof. Among these, particularly preferred are diols from renewable sources, and more preferred are 1,2-ethanediol, 1,4-butanediol and mixtures thereof.

In the case of aliphatic-aromatic precursor polyesters PP, the content of aromatic polyfunctional acids is preferably comprised between 30-80%, more preferably between 40-70% and even more preferably between 46-60% by moles with respect to the total molar content of dicarboxylic acids.

The precursor polyester PP can contain, in addition to the base monomers, at least one hydroxy acid or their lactide or lactone, in a quantity comprised between 0-49%, preferably between 0-30% by moles with respect to the molar content of repeating units. Examples of suitable hydroxy acids are glycolic, hydroxybutyric, hydroxycaproic, hydroxyvaleric, 7-hydroxy heptanoic, 8-hydroxycaproic, 9-hydroxynonanoic acid, lactic acid or lactide. The hydroxy acids can be inserted in the chain as is or can also be previously made to react with diacids or diols.

Long bifunctional molecules can also be added in quantities not exceeding 10%, also with functionality not in terminal position. Examples are dimer acids, ricinoleic acid and acids having epoxy functionalities.

Amines, amino acids and amino alcohols can also be present in percentages of up to 30% by moles with respect to all the other components.

In the process for the preparation of the precursor polyester PP one or more polyfunctional molecules (i.e. molecules having more than 2 reactively active sites), in quantities of between 0.02 and 3% by moles with respect to the quantity of dicarboxyl acids (and hydroxy acids if present), can advantageously be added in order to obtain branched products. Examples of these molecules are glycerol, pentaerythritol, trimethylol propane, citric acid, dipentaerythritol, monoanhydrosorbitol, monohydro-mannitol, acid triglycerides and triethanolamine.

Preferably, the precursor polyester PP is characterized in melted state by a Melt Flow Rate comprised between 300 and 2, more preferably between 100 and 5 g/10 min (measurement taken at 190° C./2.16 kg according to the standard ASTM D1238-89) and by a content of carboxyl end groups of less than 150, more preferably less than 50 and even more preferably less than 35 meq KOH/kg of polymer.

The measurement of the content of carboxyl end groups can be carried out as follows: 1.5-3 g of polyester are placed in a 100 ml Erlenmeyer flask together with 60 ml of chloroform. After complete dissolution of the polyester, 25 ml of 2-propanol and, immediately before analysis, 1 ml of deionised water are added. The solution thus obtained is titrated with a preliminary standardized KOH/ethanol solution. A suitable indicator is used to determine the equivalence point of the titration, such as a glass electrode for acid-base titrations in non-aqueous solvents. The carboxyl end group content is calculated from consumption of the KOH/ethanol solution according to the following equation:

$$\text{Carboxyl end group content (meq KOH/kg of polymer)} = \frac{\lfloor (V_{eq} - V_b) \cdot T \rfloor \cdot 1000}{P}$$

wherein:
$V_{eq}$=ml of KOH/ethanol solution at the equivalence point for titration of the sample;
$V_b$=ml of KOH/ethanol solution necessary to reach pH=9.5 during blank titration;
T=concentration of the KOH/ethanol solution expressed in moles/liter;
P=weight in grams of the sample.

The precursor polyester PP can also be used in blends both with other precursor polyesters of the same type and/or with other polymers both of natural or synthetic origin carrying an unsaturated terminal group. Among these, particularly preferred are carbohydrates, polyesters such as polyhydroxyalkanoates, polylactides, polylactones; polyester-urethanes, polyurethanes, polyamides, polycarbonates, polyolefins.

The production process of the precursor polyester PP can take place according to any of the processes known to the state of the art. In particular, the polyesters can advantageously be obtained with a polycondensation reaction. In said production processes, the unsaturated terminator can be added either during the polycondensation step or during a step subsequent thereto.

Advantageously, the polymerization process of the precursor polyester PP can be conducted in the presence of a suitable catalyst. As suitable catalysts, metallo-organic compounds of tin, for example derivatives of stannoic acid, titanium compounds, for example orthobutyl titanate, and aluminium compounds, for example Al-triisopropyl, antimony compounds and zinc compounds may, for example, be used.

The present invention also relates to the process for the preparation of the substantially gel-free and substantially linear biodegradable polyester BP comprising units deriving from at least one diacid and at least one diol, said process consisting of mixing and reacting with a radical initiator a precursor polyester provided with an unsaturated chain terminator, said terminator having formula:

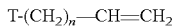

wherein "T" is selected from the group consisting of hydroxylic, carboxylic, amine, amide or ester group, and "n" is an integer number comprised between 0 and 13.

One or more radical initiators such as peroxides can be use for said process. Among these, particularly preferred are organic peroxides such as diacyl peroxides, peroxy esters, dialkyl peroxides, hydroperoxides, peroxy ketals and carbonate peroxides. Diacyl peroxides and dialkyl peroxides are preferred. Examples of these peroxides are benzoyl peroxide, lauroyl peroxide, isononanoyl peroxide, dicumyl peroxide, di-(tert-butylperoxyisopropyl)benzene, alpha,alpha'di-(tert-butylperoxy)diisopropylbenzene, tert-butylperoxide, 2,5-dimethyl-2-5-di(tertbutyl)peroxy hexane and mixtures thereof.

Said organic peroxides are advantageously added in quantities less than 0.08% by weight, preferably less than 0.05%, more preferably below 0.03% and still more preferably below 0.02% with respect to the quantity of polyester (and other polymers in the case of blend). The skilled person will easily be able to identify the effective quantity of peroxide required in relation to the properties desired for the polymer.

Said peroxides can be advantageously added as masterbatches in order to facilitate their mixing with the polyester precursor.

Said process is preferably conducted by reactive extrusion.

Also after the preparation process, the biodegradable polyester BP can have terminal double bonds and/or adducts deriving from the reaction of the chain terminator with the radical initiators.

The presence of the terminal double bonds and/or adducts deriving from the reaction of the chain terminator with the radical initiators can be determined with different methods well known to those skilled in the art, such as NMR spectroscopy or by methanolysis reactions of the polymer chain coupled with chromatographic methods combined with mass spectrometry. The skilled person will easily be able to identify structures referable either to the unsaturated chain terminator or to the reacted chain terminator after the reaction of its terminal double bond.

The biodegradable polyester BP is biodegradable according to the standard EN 13432.

The biodegradable polyester BP according to the invention can also be used in blends, also obtained by reactive extrusion, both with polyesters of the same type and with other biodegradable polyesters (such as poly L lactic acid, poly D lactic acid and stereocomplex poly D-L lactic acid, poly-ε-caprolactone, polyhydroxybutyrates, such as hydroxybutyrate-valerate, polyhydroxybutyrate-propanoate, polyhydroxybutyrate-hexanoate, polyhydroxybutyrate-decanoate, polyhydroxybutyrate-dodecanoate, polyhydroxybutyrate-hexadecanoate, polyhydroxybutyrate-octadecanoate, polyalkylene succinates), poly-3-hydroxybutyrate, poly-4-hydroxybutyrate, polysuccinates and in particular polyalkylene succinate and its copolymers with adipic acid and lactic acid or other polymers different from polyesters where the alkylene can be butylene, propylene, ethylene or also other alkylenes and mixtures thereof.

Mixtures of the biodegradable polyester BP with polylactic acid and polyhydroxyalkanoates are particularly preferred.

The biodegradable polyester BP according to the invention can also be used in blends with polymers of natural origin, such as starch, cellulose, chitin, chitosan, alginates, proteins such as gluten, zein, casein, collagen, gelatin, natural rubbers, rosin acid and its derivatives, lignins and their derivatives. The starches and celluloses can be modified, and among these starch or cellulose esters with substitution degree between 0.2 and 2.5, hydroxypropylated starches and modified starches with fatty chains may, for example, be mentioned. The starch can also be used both in destructured and gelatinized form or as a filler. The starch can represent the continuous or dispersed phase or can be in co-continuous form. In the case of dispersed starch, the starch is preferably in a form of less than 1 micron and more preferable less than 0.5 μm of average diameter.

The biodegradable polyester BP of the invention can also be blended with polyolefins such as polyethylene, polypropylene, their copolymers, polyvinyl alcohol, polyvinyl acetate, polyethylene vinyl acetate and polyethylene vinyl alcohol, urethane polyesters, polyurethanes, polyamides, polyureas, PET, PBT, PTT and polycarbonates such as polyalkylenecarbonates.

The biodegradable polyester BP and the precursor polyester PP according to the present invention can also be used as prepolymers to produce polyurethanes and polyureas.

Thanks to its limited environmental impact, the precursor polyester PP can also be advantageously made to react with precursor polymers of the same type or of different type to produce block copolymers, compatibilizers of different types, tie layers, starch complexation agents, hydrophobic-hydrophilic structures etc., so as to obtain products capable of avoiding or limiting to a minimum the use of additives with high environmental impact.

Thanks to its compatibility with starch, mixtures of biodegradable polyester BP according to the invention with starch are particularly preferred. The films obtained with said mixtures have high mechanical properties which, advantageously can reach tear strength values higher than 100 N/mm at room temperature and 50% RH.

The biodegradable polyester BP according to the invention can also be used in blends with polymers of synthetic origin and with the polymers of natural origin mentioned above. Mixtures of the biodegradable polyester BP with starch and polylactic acid or polyhydroxyalkanoates are particularly preferred.

The biodegradable polyester BP according to the invention has properties that make it suitable for use, by appropriately modulating the relative molecular weight, in numerous practical applications, such as films, injection molded products, extrusion coating products, fibers, foams, thermoformed products, etc.

In particular, the biodegradable polyesters BP according to the invention are suitable for producing:
mono- and bi-oriented films, and films multilayered with other polymeric materials;
films for use in the agricultural sector, such as films for use in mulching;
cling and stretch films for use with foodstuffs, for industrial uses, for bales in agriculture, and for wrapping waste;
bags and bin liners for the organic waste collection, such as the collection of food scraps and gardening waste;
thermoformed foodstuff packaging, both mono- and multi-layered, as in containers for milk, yogurt, meats, beverages, etc.;
coatings obtained using the extrusion coating method or lacquering using aqueous dispersions;

multilayer laminates with layers of paper, plastic, aluminium, or metallized films;
expanded or expandable beads for the production of pieces obtained by sintering;
expanded and semi-expanded products, including foam blocks formed using pre-expanded particles;
foam sheets, thermoformed foam sheets, and containers obtained from them for use in foodstuff packaging;
fruit and vegetable containers in general;
composites with gelatinised, destructured and/or complexed starch, natural starch, flours or vegetable or inorganic natural fillers;
fibres, microfibers, composite microfibers wherein the core is constituted by rigid polymers such as PLA, PET, PTT etc. and the shell is constituted by the material of the invention, composite fibres from blends, fibres with different sections, from circular to multilobed, staple fibres, woven and nonwoven fabrics or spunbonded or thermobonded for use in sanitary and hygiene products, and in the agricultural and clothing sectors;
injection molded, blow molded or rotomolded products.

Being the biodegradable polyester according to the present invention odorless, it is particularly suitable for the production of films and bags for packaging, preferably for food packaging.

The biodegradable polyester BP according to the invention can also be used as component of multilayer films wherein the different types of BP are used for the different layers also in combination with layers of cellophane, destructured starch, PLA or other polymers having high barrier properties to oxygen and/or fats.

The biodegradable polyester BP is characterised for being odourless and for a high degree of transparency, which make it advantageous for use in the food sector.

The invention is now illustrated with some examples of embodiment provided by way of non-limiting example of the scope of protection of the present patent application.

EXAMPLES

Example 1 a) Synthesis of the Precursor Polymer PP [poly(butylene terephthalate-co-butylene sebacate) at 56% by Moles of Aromatic Units Containing 0.15% by Moles of Omega Undecenoic Acid]

A 25 l reactor, provided with a mechanical stirrer, an inlet for nitrogen flow, a condenser and a connection to a vacuum pump, was loaded with the following:

| | |
|---|---|
| dimethyl ester of terephthalic acid (DMT) | 3313 g (17.08 moles) |
| sebacic acid | 2711 g (13.42 moles) |
| 1,4-butanediol | 3156 g (35.07 moles) |
| omega-undecenoic acid | 8.43 g (0.046 moles) |

The temperature was gradually increased under vigorous stirring and nitrogen flow to 210° C. The reaction was continued until 90% of the theoretical quantity of light by-products was distilled. The temperature was then increased to 240° C. and the system was subjected to a pressure of 0.6 mmHg. The reaction was continued for 120 min.

7.0 kg of polymer are obtained with shear viscosity of 674 Pas at a flow gradient $\gamma=100$ s$^{-1}$, Thermal Stability Constant $0.7 \cdot 10^{-4}$ at 180° C., melt strength<1 at 180° C., molecular weight $M_n$ of 55140 and Melt Flow Rate (MFR) of 11 g/10 min (measured at 190° C. and 2.16 kg according to the standard ASTM D1238).

b) Reactive Extrusion of the Precursor Polyester PP and Preparation of the Biodegradable Polyester BP According to the Invention 100 kg of the precursor polyester PP obtained in a) was made to react with 12 g of alpha,alpha'di-(tert-butylperoxy) diisopropylbenzene (corresponding to 0.012% in weight) in a twin screw extruder whose principal characteristics are:
extruder temperature profile: 30-100-200-170-150x3-160° C.
twin screw rotation speed: 240 rpm
active degassing A biodegradable polyester PB having the following properties is obtained:
Shear viscosity of 1011 Pas
Thermal Stability Constant $0.51 \cdot 10^{-4}$ at 180° C.
Melt Strength 1.6 g at 180° C.,
Gel fraction: <1%
The polyester is odorless.

Characterization of the Biodegradable Polyester BP According to Example 1.

2 grams of biodegradable polyester BP are placed in a 250 ml Erlenmeyer flask together with 100 ml of methanol and 0.5 g of lithium methylate and are refluxed until complete dissolution of the polymer and until a limpid solution is obtained (approximately 8 hours).

1 ml of the solution containing the polyester is taken to a pH of around 7 by a cationic exchange resin charged with H$^+$. The sample thus obtained is then diluted 1 to 50 with methyl isobutyl ketone and analyzed by GC-MS. The instrument used is a Thermo Trace-DSQ II gas chromatograph provided with split/splitless injector used in splitless configuration (injector temperature 300° C.) and a Trace TR-5MS capillary column (length 15 m, diameter 0.25 mm, stationary phase 95% dimethyl-/5% diphenyl-polysiloxane and stationary phase thickness 0.25 μm). The carrier gas used for analysis is He (flow 1.2 ml/min) The elution program consists in a temperature ramp that starts from 100° C. up to 300° C. with a gradient of 15° C./min. The injected volume is of 1 microliter.

The mass detector is provided with electronic impact ionization set at 220° C. with positive ionization and was set in Total Ion Current mode between 40 and 600 m/z.

Figure 1B:
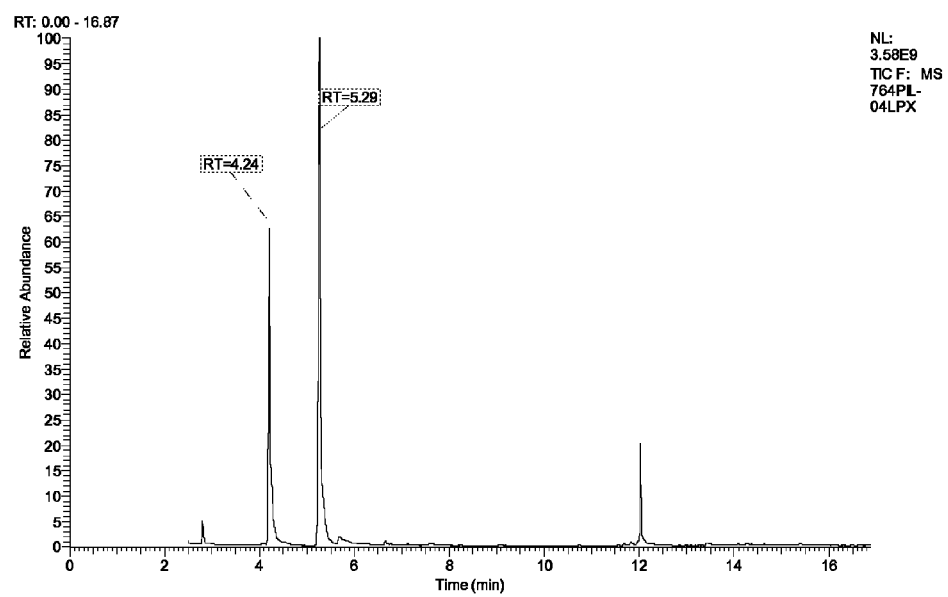

FIG. 1-*a* shows the gas chromatographic trace obtained by analyzing the sample of biodegradable polyester according to Example 1. The gas chromatographic trace shows one chromatographic peak, with retention time of 3.52 minutes, which can be used for the identification of the biodegradable polyester according to Example 1.

FIG. 1-*b* shows the gas chromatographic trace obtained by analyzing a sample of a poly(butylene terephthalate-co-butylene sebacate) at 56% by moles of aromatic units without unsaturated chain terminator which was previously subjected to reactive extrusion with 0.012% in weight of alpha'-di(t-butyl peroxy)diisopropylbenzene. The gas chromatographic trace shows no peak at or around the retention time of 3.52 minutes.

Figure 2A:
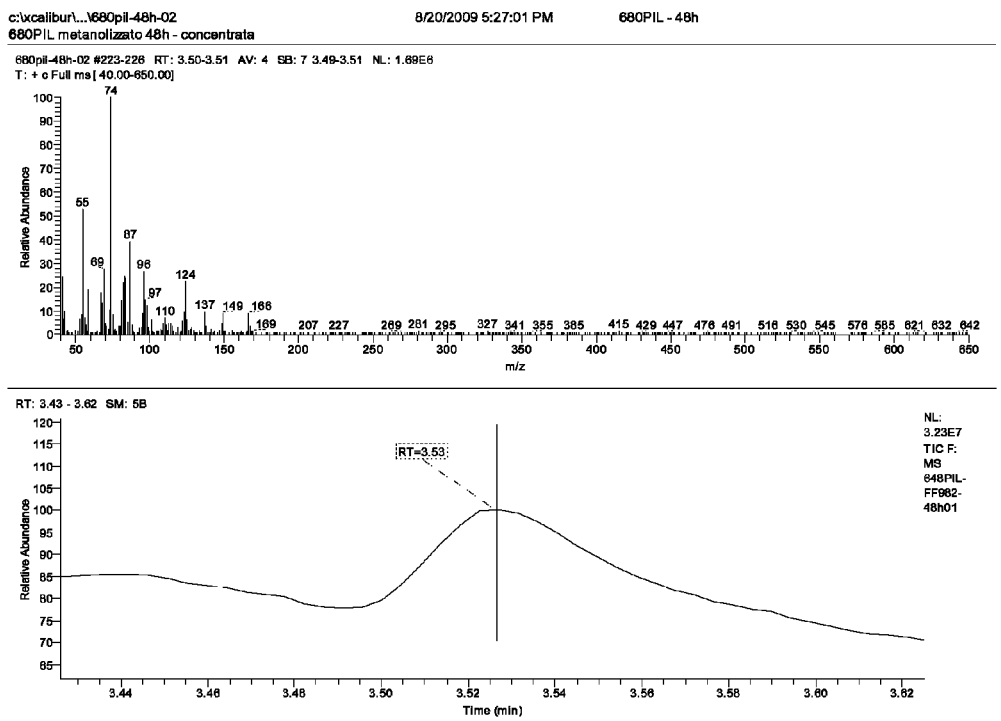
Figure 2B:
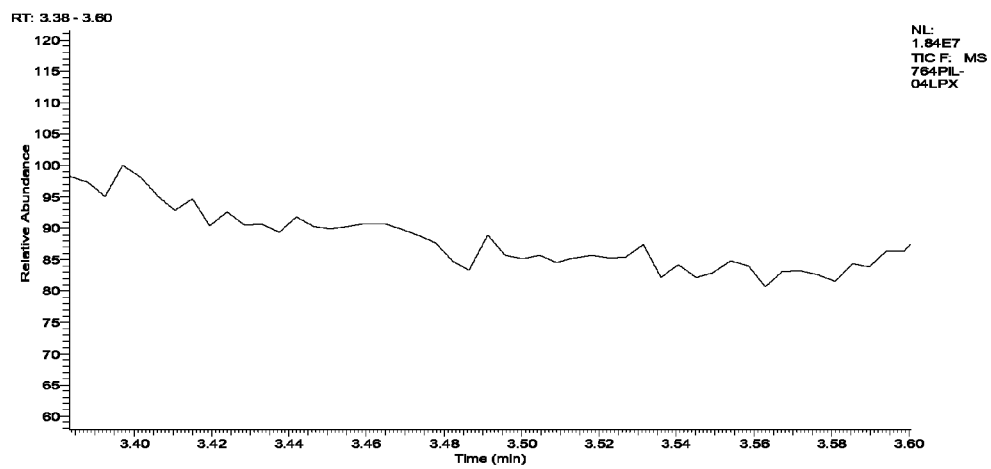

FIG. 2-*a* shows the detail of the mass spectrum of the peak at 3.52 minutes of the gas chromatographic trace shown in FIG. 1-*a*. Said peak is referable to the reacted unsaturated chain terminator of Example 1 after the reaction of its terminal double bond.

FIG. 2-*b* shows a detail of the gas chromatographic trace of FIG. 1-*b* corresponding to a retention time of 3.52 minutes. FIG. 2-b has no peak corresponding to the chromatographic peak of the polyester according to Example 1.

Example 2

Starch Based Blend 63 parts in weight of the biodegradable polyester BP obtained in Example 1 were mixed with 5 parts of poly-L-lactic acid (Mn of 130 000, MFR at 190° C., 2.16 kg of 3.5 g/10 min, lactide residue of less than 0.2% and D-isomer content of around 6%), 23.4 parts starch, 3.5 parts water and 5 parts glycerol in a Haake Rheocord 90 Rheomex TW-100 twin screw extruder.

The thermal profile was maintained between 120 and 190° C. The final water content of the granule was equal to 0.8%.

The granules thus obtained were made into film on a 40 mm Ghioldi machine having die gap=1 mm, flow rate 20 kg/h to obtain a film with a thickness of 20 μm. The film obtained was subjected to mechanical characterization tests. Each parameter was determined by means of at least 6 replicates on randomly obtained specimen of films. The values herewith reported correspond to the arithmetic mean of these replicas.

Mechanical properties (tear) (ASTM 1922—23° C. and 55% relative humidity, film thickness 31 μm).

Tear strength (N/mm) 163

Comparison Example 1 a) Synthesis of poly(butylene terephthalate-co-butylene sebacate) at 56% by Moles of Aromatic Units Containing 1.2% by Moles of Omega-Undecenoic Acid A 25 l reactor, provided with a mechanical stirrer, an inlet for nitrogen flow, a condenser and a connection to a vacuum pump, was loaded with the following:

| | |
|---|---|
| dimethyl ester of terephthalic acid (DMT) | 3313 g (17.08 moles) |
| sebacic acid | 2711 g (13.42 moles) |
| 1,4-butanediol | 3156 g (35.07 moles) |
| omega-undecenoic acid | 67.45 g (0.366 moles) |

The temperature was gradually increased under vigorous stirring and nitrogen flow to 210° C. The reaction was continued until 90% of the theoretical quantity of light by-products was distilled. The temperature was then increased to 240° C. and the system was subjected to a pressure of 0.6 mmHg. The reaction was continued for 120 min.

7. kg of polymer are obtained with shear viscosity of 540 Pas at a flow gradient $\gamma=100$ s$^{-1}$, Thermal Stability Constant 1.7·10 at 180° C., melt strength<1 at 180° C., molecular weight $M_n$ of 43000 and Melt Flow Rate (MFR) of 14.4 g/10 min (measured at 190° C. and 2.16 kg according to the standard ASTM D1238).

b) Reactive Extrusion of the Polyester According to Step a)

100 kg of the polyester obtained in a) was made to react with 600 g of alpha,alpha'di-(tert-butylperoxy)diisopropyl-benzene (corresponding to 0.6% in weight) in a twin screw extruder whose principal characteristics are:

extruder temperature profile: 30-100-200-170-150×3-160° C.

twin screw rotation speed: 240 rpm active degassing

A polyester having the following properties was obtained:

Shear viscosity: not detectable

Thermal Stability Constant: not detectable

Melt Strength: not detectable

Gel fraction .>5%

Comparison Example 2 a) Synthesis of the Precursor Polymer PP [poly(butylene terephthalate-co-butylene sebacate) at 56% by Moles of Aromatic Units Containing 2% by Moles of Omega Undecenoic Acid]

A 25 l reactor, provided with a mechanical stirrer, an inlet for nitrogen flow, a condenser and a connection to a vacuum pump, was loaded with the following:

| | |
|---|---|
| dimethyl ester of terephthalic acid (DMT) | 3313 g (17.08 moles) |
| sebacic acid | 2711 g (13.42 moles) |
| 1,4-butanediol | 3156 g (35.07 moles) |
| omega-undecenoic acid | 112.4 g (0.61 moles) |

The temperature was gradually increased under vigorous stirring and nitrogen flow to 210° C. The reaction was continued until 90% of the theoretical quantity of light by-products was distilled. The temperature was then increased to 240° C. and the system was subjected to a pressure of 0.6 mmHg. The reaction was continued for 120 min.

7.0 kg of polymer were obtained with shear viscosity of 260 Pas at a flow gradient $\gamma=100$ s$^{-1}$, Thermal Stability Constant 1.24·10$^{-4}$ at 180° C., melt strength<1 at 180° C., Melt Flow Rate (MFR) of 35 g/10 min (measured at 190° C. and 2.16 kg according to the standard ASTM D1238).

b) Reactive Extrusion of the Precursor Polyester PP and Preparation of the Biodegradable Polyester PB According to the Invention 100 kg of the precursor polyester PP obtained in a) was made to react with 24 g of alpha,alpha'di-(tert-butylperoxy) diisopropylbenzene (corresponding to 0.024% in weight) in a twin screw extruder whose principal characteristics are:

extruder temperature profile: 30-100-200-170-150×3-160° C.

twin screw rotation speed: 240 rpm active degassing

A biodegradable polyester PB having the following properties is obtained:

Shear viscosity of 2674 Pas

Thermal Stability Constant 0.41·10$^{-4}$ at 180° C.

Melt Strength 11 g at 180° C.,

Gel fraction: >5%

The invention claimed is:

1. A biodegradable thermoplastic polyester comprising units deriving from at least one diacid and at least one diol, obtained by reaction with a radical initiator starting from a precursor polyester, said precursor polyester being an aliphatic-aromatic biodegradable polyesters having the aromatic part composed by at least one aromatic polyfunctional acid and the aliphatic part composed by at least one C6-C13 aliphatic diacid, and at least one aliphatic diol, and an unsaturated chain terminator, said terminator having the formula: T-(CH2)n-CH=CH2, wherein "T" is selected from the group consisting of hydroxylic, carboxylic, amine, amide or ester group, and "n" is 8 or 9; wherein the content of said unsaturated chain terminator is between 0.01 and less than 1% by moles with respect to the moles of repetitive units of the polyester precursor; the content of said radical initiator is less than 0.08 wt % with respect to the quantity of said precursor polyester; said precursor polyester having a gel fraction lower than 5%(w/w), a melt strength at 180° C. of 0.9 to 3 grams, a Shear Viscosity of 300 to 2,000 Pas and a structure comprising the multiple repetition in linear sequence of repeating units of acids and diols held together by ester linkage, in which the quantity of diacids or hydroxy-acids of one or more polyfunctional molecules, and the derivatives thereof, is at most 3% by moles, the content of said at least one aromatic polyfunctional acid acids being between 30 and 80% by moles with respect to the total molar content of dicarboxylic acids.

2. The biodegradable polyester according to claim 1 wherein said terminator "T" is a carboxylic or hydroxylic group.

3. The biodegradable polyester according to claim 1 wherein said unsaturated chain terminator is omega-undecenoic acid, omega-undecylenic alcohol or mixtures thereof.

4. The biodegradable polyester according to claim 1, wherein said at least one aromatic polyfunctional acid is a dicarboxylic aromatic compound of the phthalic acid type and/or ester thereof and/or a dicarboxylic aromatic compound compounds of vegetable renewable origin and/or ester thereof.

5. The biodegradable polyester according to claim 4, wherein said at least one aromatic polyfunctional acid is a mixture of a dicarboxylic aromatic compound of the phthalic acid type and/or ester thereof and a dicarboxylic aromatic compound of vegetable renewable origin and/or ester thereof.

6. The biodegradable polyester according to claim 4, wherein said at least one aromatic polyfunctional acid is terephthalic acid and and/or ester thereof.

7. The biodegradable polyester according to claim 4 wherein said at least one aromatic polyfunctional acid is 2,5-furandicarboxylic acid and/or ester thereof.

8. The biodegradable polyester according to claim 1, wherein said at least one $C_6$-$C_{13}$ aliphatic diacid is selected from the group consisting of adipic acid, pimelic acid suberic acid, azelaic acid, sebacic acid, undecandioic acid, dodecandioic acid, brassylic acid and mixtures thereof.

9. The biodegradable polyester according to claim 8, wherein said at least one $C_6$-$C_{13}$ aliphatic diacid is of vegetable renewable origin.

10. The biodegradable polyester according to claim 9 wherein said at least one aliphatic diacid of vegetable renewable origin is selected from the group consisting of azelaic acid, sebacic acid and mixtures thereof.

11. The biodegradable polyester according to claim 1 wherein said precursor polyester contains at least one hydroxy acid, lactide thereof and/or lactone, in a quantity between 0-49%, by moles with respect to the molar content of repeating units.

12. The biodegradable polyester according to claim 1 wherein said precursor polyester is blended with another precursor polyester of the same type and/or with another polymer of natural or synthetic origin having an unsaturated terminal group.

13. The biodegradable polyester according to claim 1 wherein with a polyester of the same type and with another biodegradable polymer either of synthetic or natural origin.

14. A blend of the biodegradable polyester according to claim 13, wherein said biodegradable polymer of natural origin is selected from the group consisting of starch, cellulose, chitin, chitosan, alginates, proteins, lignins and derivatives thereof.

15. The biodegradable polyester according to claim 1 wherein the content of said unsaturated chain terminator is between 0.01% and 0.5% by moles with respect to the moles of repetitive units of the polyester precursor.

* * * * *